United States Patent [19]

Fennemann

[11] Patent Number: 4,851,202

[45] Date of Patent: Jul. 25, 1989

[54] PROCESS FOR THE SIMULTANEOUS REMOVAL OF NITROGEN OXIDES AND SULFUR DIOXIDE FROM AN OXYGEN-CONTAINING EXHAUST GAS

[75] Inventor: Wolfgang Fennemann, Karben, Fed. Rep. of Germany

[73] Assignee: Metallgesellschaft Aktiengesellschaft, Frankfurt am Main, Fed. Rep. of Germany

[21] Appl. No.: 146,442

[22] Filed: Jan. 21, 1988

[30] Foreign Application Priority Data

Jan. 21, 1987 [DE] Fed. Rep. of Germany ....... 3701527

[51] Int. Cl.$^4$ .......................... B01J 8/00; C01B 21/00; C01B 17/00
[52] U.S. Cl. ...................................... 423/239; 423/244
[58] Field of Search ............... 423/239, 239 A, 244 A, 423/244 R, 242 A, 242 R

[56] References Cited

FOREIGN PATENT DOCUMENTS

| | | |
|---|---|---|
| 2726892 | 4/1979 | Fed. Rep. of Germany ...... 423/239 |
| 2919812 | 11/1980 | Fed. Rep. of Germany . |
| 3031286 | 8/1981 | Fed. Rep. of Germany . |
| 3429332 | 2/1986 | Fed. Rep. of Germany . |
| 58-174224 | 10/1983 | Japan ................................. 423/239 |

*Primary Examiner*—Gregory A. Heller
*Attorney, Agent, or Firm*—Felfe & Lynch

[57] ABSTRACT

Disclosed is a process of simultaneously removing nitrogen oxides and sulfur dioxide from an oxygen-containing exhaust gas.

An exhaust gas containing $NO_x$ and $SO_2$ is mixed with $NH_3$ and is then introduced as a fluidizing gas into a fluidized bed, which consists of a catalyst for effecting a reduction of NO with $NH_3$ to form $N_2$ and an oxidation of $SO_2$ with $O_2$ to form $SO_3$. The catalyst consists of a carrier and of catalytically active substances consisting of $V_2O_5$ and of $Fe_2O_3$, $FeSO_4$ and/or $Fe_2(SO_4)_3$, and alkali sulfates. The $SO_3$ formed by oxidation may be recovered as sulfuric acid or may be combined with a desulfurizing agent, which consists of $Na_2CO_3$, MgO, $MgCO_3$, CaO, $CaCO_3$ and/or $Ca(OH_2)$.

21 Claims, No Drawings

PROCESS FOR THE SIMULTANEOUS REMOVAL OF NITROGEN OXIDES AND SULFUR DIOXIDE FROM AN OXYGEN-CONTAINING EXHAUST GAS

BACKGROUND OF THE INVENTION

The present invention is in a process for the simultaneous removal of nitrogen oxides and sulfur dioxide from an oxygen-containing exhaust gas.

The exhaust gases produced by the combustion of fuel with atmospheric oxygen contain nitrogen oxides as well as $SO_2$. Both substances are pollutants to the environment and therefore must be removed from the exhaust gases before its discharge to the atmosphere. Typically, such exhaust gases contain between 500 and 10,000 mg/sm$^3$ $SO_2$ and between about 100 and 2,000 mg/sm$^3$ nitrogen oxide, calculated as NO. In addition to $SO_2$ and nitrogen oxides, the exhaust gases contain nitrogen, water vapor and $CO_2$ as well as residual oxygen, the latter usually being present in the exhaust gas in a concentration of from 1 to 10%.

In known processes, nitrogen oxides and $SO_2$ can jointly be removed from the exhaust gases by means of an absorbent solution which contains, inter alia, calcium hydroxide, $Fe^{2+}$ ions and ethylenediamineotetraacetic acid. However, such processes involve a considerable structural expenditure and result in solid and liquid residues, which must be after-treated because they cannot readily be disposed of in a dump or discharged into a sewer.

Thus, it is an object of the invention to provide a reliable process which results in a substantially complete removal of $SO_2$ and of nitrogen oxides from exhaust gases, which can be continuously carried out for an extended period and which results in process products friendly to the environment.

THE INVENTION

The above object and others of the invention are accomplished in that the exhuast gas is mixed with $NH_3$ and is then supplied as a fluidizing gas to a fluidized bed. The fluidized bed consists of a catalyst for effecting a reduction of NO with $NH_3$ to form $N_2$ and an oxidation of $SO_2$ with $O_2$ to form $SO_3$. THe process can be carried out continuously for an extended period of time, is reliable in operation and permits a simultaneous and substantially complete removal of $SO_2$ and nitrogen oxides from the exhaust gases.

Also within the scope of the invention is mixing the reducing agent $NH_3$ into the exhaust in a mole ratio of NO : $NH_3$ of 1 : 0.8 to 1 : 1.2, and feeding the exhaust gas to the fluidized bed at a space velocity from 1,000 to 20,000 h$^{-1}$, preferably 2,000 to 10,000 h$^{-1}$ and maintaining a temperature of from 350° to 600° C., preferably from 400° to 500° C., in the fluidized bed. Under such conditions $N_2$ and $SO_3$ form rapidly in a high yield even on a commercial scale.

The process in accordance with the invention is carried out with a particularly high degree of success in a circulating fluidized bed in which the fluidizing gas flows at a velocity from 3 to 12 m/sec, preferably 5 to 10 m/sec.

It is also within the scope of the invention that the catalyst have a particle diameter of from 0.1 to 3 mm, preferably from 0.2 to 2 mm, and the catalyst consists of a carrier and a catalytically active substance consisting of $V_2O_5$ and of $Fe_2O_3$, $FeSO_4$ and/or $Fe_2(SO_4)_3$. In a preferred embodiment, the carrier of the catalyst consists of $SiO_2$ and the catalyst contains a promotor consisting of $Na_2SO_4$, $K_2SO_4$ and/or $Cs_2SO_4$.

It has been found that $SO_2$ will be oxidized to $SO_3$ by the residual oxygen contained in the exhaust gas with the $V_2O_5$ acting as on oxidation catalyst. At the same time, the NO is reduced by the reducing agent $NH_3$ to form nitrogen and water in a reaction in which $Fe_2O_3$ and the sulfates of divalent and trivalent iron act as reducing catalyst. More than 90% of the nitrogen oxides and more than 90% of the $SO_2$ are removed from the exhaust gas by means of the catalyst which is used in the process in accordance with the invention. The process of the invention can be carried out with particularly high success with the catalyst having a composition of from 2 to 10% by weight $FeSO_4$ and/or $Fe_2(SO_4)_3$, 2 to 6% by weight $V_2O_5$, 5 to 15% by weight $K_2SO_4$, with the balance $SiO_2$.

In another embodiment, the catalyst consists of from 2 to 10% by weight $FeSO_4$ and/or $Fe_2(SO_4)_3$, 2 to 6% by weight $V_2O_5$, 5 to 15% by weight $K_2SO_4$, balance $SiO_2$, with from 5 to 100 mole percent of the $K_2SO_4$ being replaced by $Cs_2SO_4$.

The catalyst may also consist of a mixture of two components. The first component consists of from 3 to 10% by weight $V_2O_5$, 10 to 30% by weight $K_2SO_4$, with the balance $SiO_2$. The second component consists of $FeSO_4$ and/or $Fe_2(SO_4)_3$, balance $SiO_2$, and contains iron sulfate, calculated as $Fe_2O_3$, in an amount of from 2 to 14% by weight, preferably 4 to 12% by weight, and $SiO_2$ in an amount of from 86 to 90% by weight, preferably 88 to 96% by weight.

The previously described catalyst may be modified by the $K_2SO_4$ content being replaced by from 5 to 100 mole percent $Na_2SO_4$ and/or $Cs_2SO_4$.

The vanadium-containing and the iron-containing components of the catalyst are mixed in a weight ratio of from 3:1 to 1:3.

It is also within the scope of the invention that $SO_3$ is removed from the fluidizing gas by a desulfurizing agent. The desulfurizing agent may be one or more of $Na_2CO_3$, MgO, $MgCO_3$, CaO, $CaCO_3$ and/or $Ca(OH)_2$. The desulfurizing agent is added to the fluidizing gas in a mole ratio of (2 Me$^+$ or Me$^{2+}$) : S = 1:1 to 3:1, where Me$^+$ = Na; Me$^{2+}$ = Mg, Ca; S = sulfur content of the exhaust gas, which contains sulfur in the form of $SO_2$. The $SO_3$ which has been formed by the oxidation of the $SO_2$ reacts very quickly with the desulfurizing agent to form the sulfates of sodium, magnesium and/or calcium. These sulfates can readily be removed from the purified exhaust gas.

It is particularly prefered within the scope of the invention to use a desulfurizing agent having a particle diameter of from 0.01 to 3 mm. Also within the scope of the invention is that the desulfurizing agent is supplied to the fluidizing bed or is contacted with the fluidizing gas when the fluidizing gas has left the fluidized bed and has been subjected to a dust-collected treatment.

Owing to the cooperatoin of the catalyst and the desulfurizing agent having the particle sizes called for in accordance with the invention and of the gas at the contemplated velocity, the desulfurizing agent can be supplied to the fluidized bed because the catalyst particles remain in the fluidized bed and the dustlike fines abraded from the catalyst and the dustlike sulfates are discharged from the fluidized bed. If the desulfurizing agent supplied to the fluidized bed consists of relatively large particles having diameters of from 0.1 to 3 mm, the hard catalyst particles will act to produce a dustlike desulfurizing agent, which reacts quickly with the $SO_3$ to produce dustlike reaction products (sulfates), which are discharged from the fluidized bed. Since the catalyst has a high mechanical strength, the rate of abrasion of fines from the catalyst will be low and the sulfates will contain only small quantities of the catalytically active substances.

It is also within the scope of the invention that the $SO_3$ is removed from the fluidizing gas by condensation and by scrubbing with water or sulfuric acid when the fluidizing gas has left the fluidized bed and has been subjected to a dust-collecting treatment. The use of that process feature will result in a production of sulfuric acid, which can be used as a raw material in numerous fields.

The exhaust gas which has been purified by the process in accordance with the invention contains pollutants in the following amounts.

$NH_3 < 10$ mg/sm$^3$;
$SO_3 < 1$ mg/sm$^3$;
$NO < 10\%$ of the NO content of the unpurified exhaust gas; and
$SO_2 < 10\%$ of the $SO_2$ content of the unpurified exhaust gas.

The subject matter of the invention will now be explained more in detail with reference to an Example.

The process in accordance with the invention was used to purify an exhaust gas composed as follows:
$SO_2$, 4,975 mg/sm$^3$
HCl, 66 mg/sm$^3$
$NO + NO_2$, 758 mg/sm$^3$, calculated as NO
$H_2O$, 16.6% by volume
$CO_2$, 11.4% by volume
$O_2$, 7% by volume
$N_2$, balance The exhaust gas was supplied to the fluidized bed at a gas velocity of 1.5 m/second. $NH_3$ at a mole ratio of $NH_3 : NO = 1:1$ was added to the exhaust gas shortly before it entered the fluidized bed reactor. A temperature of 400° C. and a space velocity of about 3,000 h$^{-1}$ (space velocity in h$^{-1}$ = gas volume per hour divided by catalyst volume) were maintained in the fluidized bed. Dry dustlike $Ca(OH)_2$ was supplied to the fluidized bed at a mole ratio of Ca : S = 2.5 :1. The fluidized bed contained 2 parts of nitrogen oxide-removing catalyst (8% by weight $FeSO_4$ on a carrier of $SiO_2$) and 1 part by weight of an oxidation catalyst (8% by weight $V_2O_5$, 20% by weight $K_2SO_4$, 5% by weight $Na_2SO_4$, balance $SiO_2$).

The purified exhaust gas leaving the fluidized bed contained 6 to 7 mg/sm$^3$ $NH_3$ and less than 1 mg/sm$^3$ $SO_3$. The purified exhaust gas contained 400 mg/sm$^3$ $SO_2$ and the desulfurizing efficiency of the process in accordance with the invention amounted to 92%. The purified exhaust gas contained 76 mg/sm$^3$ $NO_x$ which corresponds to a removal of 90% nitrogen oxide. The other acid constituents contained in the unpurified exhaust gas and mainly consisting of HCl could no longer be detected in the purified exhaust gas because they had reacted with the desulfurizing agent $Ca(OH)_2$.

In a cyclone and a succeeding electrostatic precipitator the dustlike calcium compounds and the dustlike fines abraded from the catalyst were almost entirely removed from the purified exhaust gas. As the desulfurizing agent reacts only in part with the $SO_3$ in a single pass through the fluidized bed, the desulfurizing agent must be recycled in order to utilize the desulfurizing agent to a higher degree.

It will be submitted that the specification and examples are illustrative but not limitative of the present invention and that other embodiments within the spirit and scope of the invention will suggest themselves to those skilled in the art.

I claim:

1. A process for the simultaneous removal of nitrogen oxides and sulfur dioxide from an oxygen-containing exhaust gas comprising: adding $NH_3$ into the exhaust gas; and introducing the exhaust gas as a fluidizing gas into a circulating fluidized bed through which the gas flows at a velocity of from 3 to 12 m/sec., the fluidized bed consisting essentially of a catalyst for effecting a reduction of NO with $NH_3$ to form $N_2$ and an oxidation of $SO_2$ with $O_2$ to form $SO_3$.

2. The process of claim 1 wherein the reducing agent $NH_3$ is admixed with the exhaust gas in a mole ratio of $NO:NH_3 = 1:0.8$ to $1:1.2$.

3. The process of claim 1 wherein the exhaust gas is fed to the fluidized bed at a space velocity of from 1,000 to 20,000 h$^{-1}$, preferably 2,000 to 10,000 h$^{-1}$.

4. The process of claim 1 wherein the fluidized bed is maintained at a a temperature of from 350° to 600° C., preferably from 400° to 500° C.

5. The process of claim 1 wherein the fluidizing gas flows at a velocity of from 5 to 10 m/sec.

6. The process of claim 1 wherein the catalyst has a particle diameter of from 0.1 to 3 mm, preferably from 0.2 to 2 mm.

7. The process of claim 1 wherein the catalyst consists of a carrier and of catalytically active substances consisting of $V_2O_5$ and of $Fe_2O_3$, $FeSO_4$ and/or $Fe_2(SO_4)_3$.

8. The process of claim 7 wherein the carrier of the catalyst consists of $SiO_2$.

9. The process of claim 1 wherein the catalyst contains a promotor consisting of $Na_2SO_4$, $K_2SO_4$ and/or $Cs_2SO_4$.

10. The process of claim 1 wherein the catalyst consists of from 2 to 10% by weight $FeSO_4$ and/or $Fe_2(SO_4)_3$, 2 to 6% by weight $V_2O_5$, 5 to 15% by weight $K_2SO_4$, balance $SiO_2$.

11. The process of claim 1 wherein the catalyst consists of from 2 to 10% by weight $FeSO_4$ and/or $Fe_2(SO_4)_3$, 2 to 6% by weight $V_2O_5$, 5 to 15% by weight $K_2SO_4$, balance $SiO_2$, and from 5 to 100 mole percent of the $K_2SO_4$ having been replaced by $Cs_2SO_4$.

12. The process of claim 1 wherein the catalyst consists of a mixture of two components, the first of which consists of from 3 to 10% by weight $V_2O_5$, 10 to 30% by weight $K_2SO_4$, balance $SiO_2$, and the second component consists of $FeSO_4$ and/or $Fe_2(SO_4)_3$, balance $SiO_2$, and contains iron sulfate, calculated as $Fe_2O_3$, in an amount of from 2 to 14% by weight, preferably 4 to 12% by weight, and $SiO_2$ in an amount of from 86 to 98% by weight, preferably 88 to 96% by weight.

13. The process of claim 12 wherein the $K_2SO_4$ content has been replaced by from 5 to 100 mole percent $Na_2SO_4$ and/or $Cs_2SO_4$.

14. The process of claim 12 wherein the vanadium-containing and the iron-containing components of the catalyst are mixed in a weight ratio of from 3:1 to 1:3.

15. The process of claim 1 wherein the $SO_3$ is removed from the fluidizing gas by a desulfurizing agent selected from the group consisting of $Na_2CO_3$, MgO, $MgCO_3$, CaO, $CaCO_3$ and/or $Ca(OH)_2$.

16. The process of claim 15, wherein the desulfurizing agent is added to the fluidizing gas in a mole ratio of ($2Me^+$ or $Me^{2+}$) : $S = 1:1$ to $3:1$.

17. The process of claim 15 wherein the desulfurizing agent has a particle diameter of from 0.01 to 3 mm.

18. The process of claim 15 wherein the desulfurizing agent is supplied to the fluidized bed.

19. The process of claim 15 further comprising subjecting the fluidizing gas to a dust collecting treatment after the fluidizing gas has left the fluidized bed but before it is contacted with the desulfurizing agent.

20. The process of claim 1 wherein the $SO_3$ is removed from the fluidizing as by condensation and by scrubbing with water or sulfuric acid when the fluidizing gas has left the fluidized bed and has been subjected to a dust-collecting treatment.

21. A process for the simultaneous removal of nitrogen oxides and sulfur dioxide from an oxygen-containing exhaust gas comprising: adding $NH_3$ into the exhaust gas; and introducing the exhaust gas as a fluidizing gas into a circulating fluidized, the fluidizing gas flowing through the bed at a velocity of from 3 to 12 m/sec., the fluidized bed being maintained at a temperature of from 350 to 600° C., the fluidized bed consisting of a mixture of a catalyst and a desulfurizing agent, the catalyst having a particle diameter of from 0.1 to 3 mm and a carrier of $SiO_2$, the catalyst consisting essentially of a mixture of two components,
  (a) the first component of the catalyst consisting of from 3 to 10% by weight $V_2O_5$, from 10 to 30% by weight $K_2SO_4$ wherein 5 to 100 mole percent of the $K_2SO_4$ is replaced by $Na_2SO_4$ and/or $Cs_2SO_4$, the balance being $SiO_2$;
  (b) the second component of the catalyst consisting of at least one of the iron sulfates $FeSO_4$ and $Fe_2(SO_4)_3$, balance $SiO_2$, the content of iron sulfate, calculated as $Fe_2O_3$, being 2 to 14% by weight and the $SiO_2$ content being 86 to 98% by weight;
the first component and the second component being mixed in the catalyst in a weight ratio of from 3:1 to 1:3; the desulfurizing agent being selected from the group consisting of $Na_2CO_3$, $MgO$, $MgCO_3$, $CaO$, $CaCO_3$ and $Ca(OH)_2$, the particle diameter of the desulfurizing agent being from 0.01 to 3 mm, the desulfurizing agent being supplied to the fluidized bed.

* * * * *